(12) United States Patent
Nakano

(10) Patent No.: US 8,473,992 B2
(45) Date of Patent: Jun. 25, 2013

(54) MULTICHANNEL DATA TRANSFER APPARATUS AND ITS METHOD

(75) Inventor: Yasuhiko Nakano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 732 days.

(21) Appl. No.: 12/371,236

(22) Filed: Feb. 13, 2009

(65) Prior Publication Data

US 2009/0150942 A1 Jun. 11, 2009

Related U.S. Application Data

(63) Continuation of application No. PCT/JP2006/316113, filed on Aug. 16, 2006.

(51) Int. Cl.
| | |
|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04N 7/173 | (2006.01) |
| H04N 7/12 | (2006.01) |
| H04N 11/02 | (2006.01) |
| H04N 11/04 | (2006.01) |
| H04B 1/66 | (2006.01) |

(52) U.S. Cl.
USPC ............ 725/96; 725/93; 725/95; 375/240.02; 370/229

(58) Field of Classification Search
None
See application file for complete search history.

(56) References Cited

U.S. PATENT DOCUMENTS

| 5,926,483 | A  * | 7/1999 | Javitt ............................. 370/477 |
| 6,356,945 | B1 | 3/2002 | Shaw et al. |
| 7,069,342 | B1 * | 6/2006 | Biederman ................... 709/247 |
| 2003/0046704 | A1 * | 3/2003 | Laksono et al. ............... 725/96 |
| 2005/0188112 | A1 | 8/2005 | Desai et al. |
| 2007/0081594 | A1 | 4/2007 | Amino |

FOREIGN PATENT DOCUMENTS

| GB | 2 367 219 A | 3/2002 |
| JP | 63-302635 | 12/1988 |
| JP | 10-119671 | 5/1998 |
| JP | 10-260324 | 9/1998 |
| JP | 11-177581 | 7/1999 |

(Continued)

OTHER PUBLICATIONS

European Search Report dated Sep. 5, 2011 in corresponding European Patent Application 06796472.6.

(Continued)

*Primary Examiner* — Mark D Featherstone
(74) *Attorney, Agent, or Firm* — Staas & Halsey LLP

(57) ABSTRACT

The multichannel data transfer apparatus is connected to a transmission line in which a plurality of connected nodes have their respective transmission channels and transmit compressed data in a predetermined present embodiment in accordance with bandwidths assigned to the respective channels, and the multichannel data transfer apparatus includes a calculating device that, when there is a request to change the number of transmission channels used to transmit compressed data in the transmission period, calculates a data compression rate and a transmission bandwidth for each of the transmission channels to be used in transmitting the compressed data to the transmission line when the number of the transmission channels is actually changed, and a notifying device that notifies each transmission channel of at least one of the calculated transmission bandwidth and transmission compression rate.

9 Claims, 16 Drawing Sheets

FOREIGN PATENT DOCUMENTS

| | | |
|---|---|---|
| JP | 2000-151643 | 5/2000 |
| JP | 2002-261717 | 9/2002 |
| JP | 2004-7317 | 1/2004 |
| JP | 2004-155395 | 6/2004 |
| JP | 2005-117614 | 4/2005 |
| WO | 99/00984 | 1/1999 |
| WO | 2005/053316 A1 | 6/2005 |

OTHER PUBLICATIONS

Japanese Office Action issued May 10, 2011 in corresponding Japanese Patent Application 2008-529802.

Notice of Rejection Ground for Japanese Application No. 2008-529802; mailed Sep. 13, 2011.

* cited by examiner

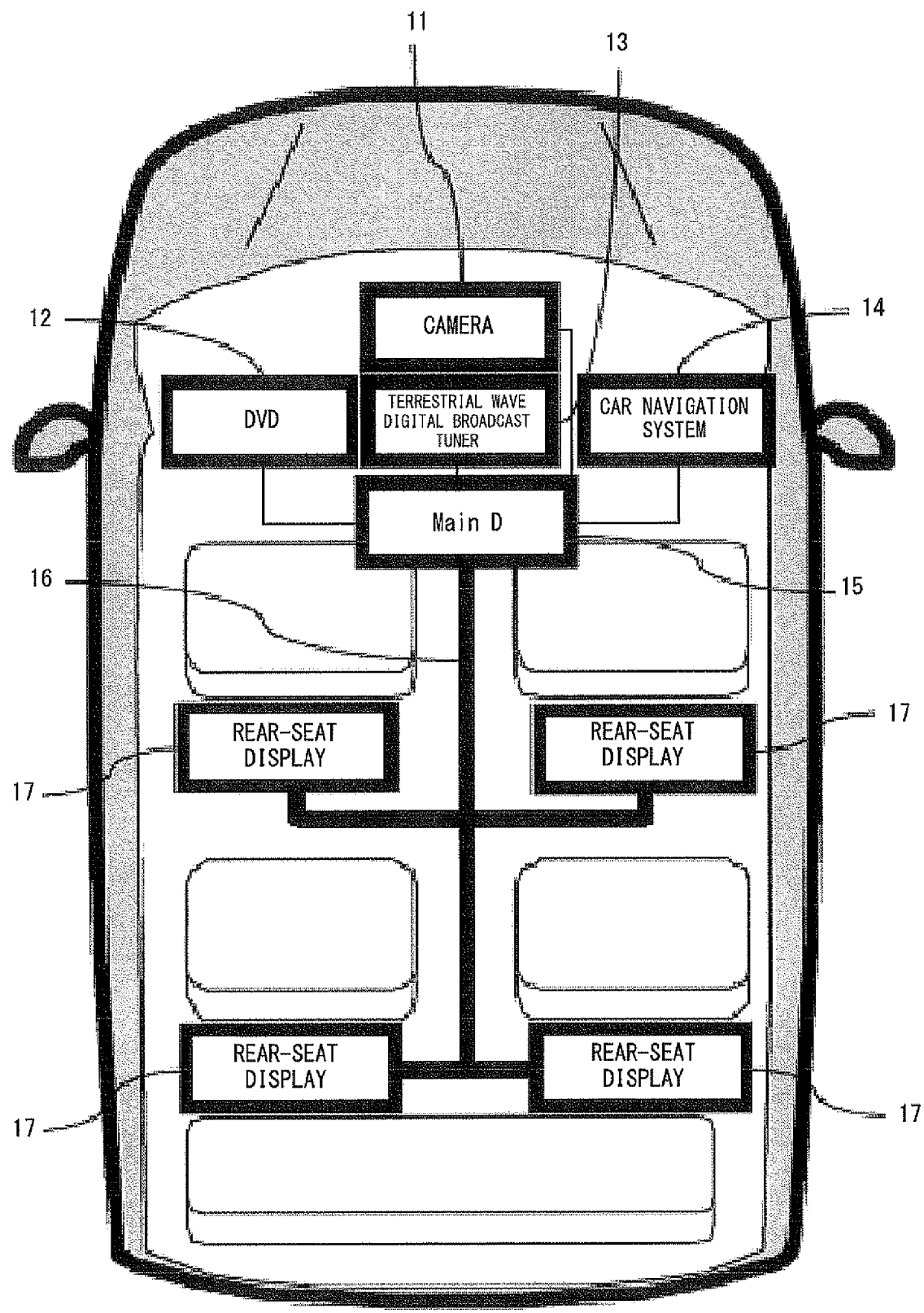
F I G. 1

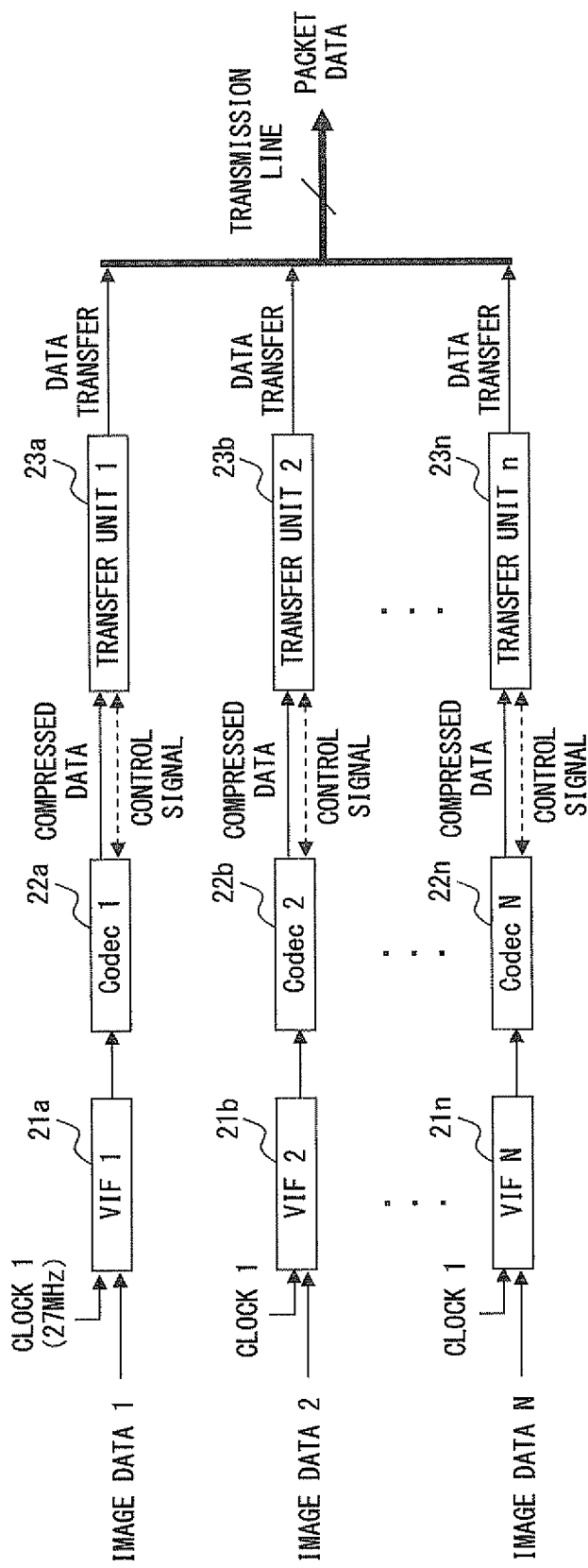
F I G. 2

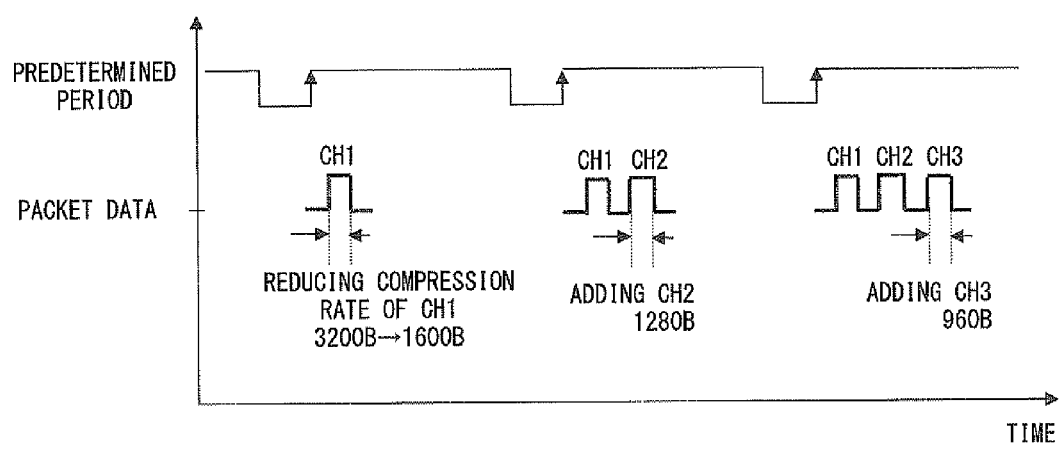
F I G. 3

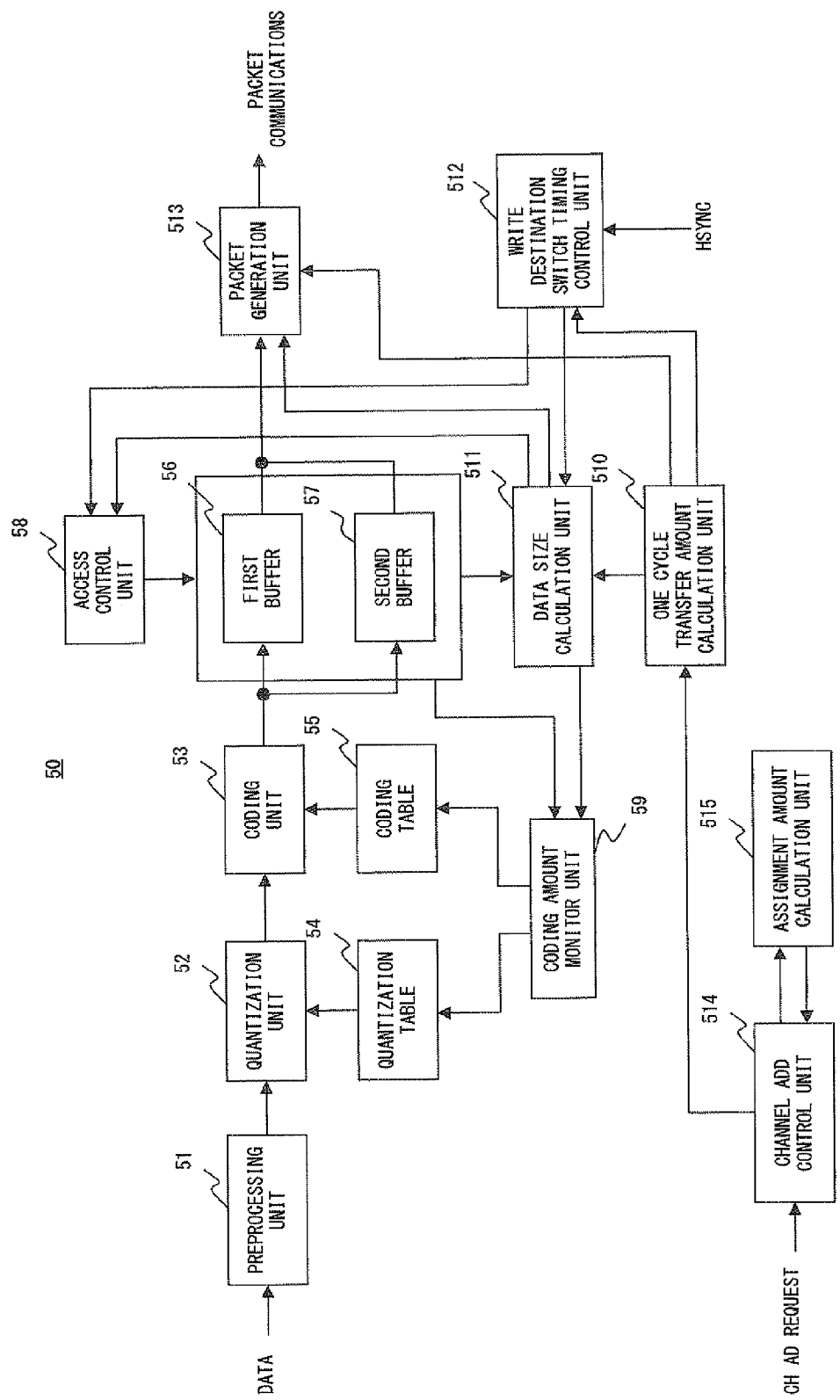
F I G. 5

| ITEM NUMBER | HORIZONTAL SIZE | BYTE/ PIXEL | VERTICAL SIZE | NUMBER OF FRAMES | COMPRESSION RATE (PART) | BIT RATE (Mbps) | NUMBER OF LINES TO BE TRANSFERRED IN ONE CYCLE | NUMBER OF BYTES TO BE TRANSFERRED IN ONE CYCLE | NUMBER TO BE INSERTED IN S400 |
|---|---|---|---|---|---|---|---|---|---|
| ① | 800 | 3 | 480 | 60 | 3 | 184.32 | 4 | 3200 | 1 |
| ② | 720 | 2 | 480 | 30 | 3 | 55.296 | 2 | 960 | 4 |
| ③ | 640 | 3 | 480 | 30 | 3 | 73.728 | 2 | 1280 | 3 |
| ④ | 640 | 2 | 480 | 30 | 3 | 49.152 | 2 | 854 | 5 |
| ⑤ | 320 | 3 | 240 | 30 | 3 | 18.432 | 1 | 320 | 14 |
| ⑥ | 320 | 2 | 240 | 30 | 3 | 12.288 | 1 | 214 | 21 |
| ⑦ | 800 | 3 | 480 | 60 | 6 | 92.16 | 4 | 1600 | 2 |
| ⑧ | 720 | 2 | 480 | 30 | 6 | 27.648 | 2 | 480 | 9 |
| ⑨ | 640 | 3 | 480 | 30 | 6 | 36.864 | 2 | 640 | 7 |
| ⑩ | 640 | 2 | 480 | 30 | 6 | 24.576 | 2 | 430 | 10 |
| ⑪ | 320 | 3 | 240 | 30 | 6 | 9.216 | 1 | 160 | 28 |
| ⑫ | 320 | 2 | 240 | 30 | 6 | 6.144 | 1 | 110 | 42 |
| .... | .... | .... | .... | .... | .... | .... | .... | .... | .... |

F I G. 6

|   | Navi | DVD | TV | CAMERA 1 QVGA | CAMERA 2 QVGA | BAND (Mbps) |
|---|---|---|---|---|---|---|
| ① | 1/3 | – | – | – | – | 184 |
| ② | 1/3 | – | 1/3 | – | – | 239 |
| ③ | 1/3 | 1/3 | – | – | – | 239 |
| ④ | 1/6 | 1/3 | 1/3 | – | – | 202 |
| ⑤ | 1/6 | 1/3 | 1/3 | 1/3 | 1/3 | 226 |

FIG. 12

| | SIZE | | FRAME | | COLOR SPACE | | COLOR COMPONENT DYNAMIC RANGE | |
|---|---|---|---|---|---|---|---|---|
| | LARGE | SMALL | 15fps | 30fps | YUV | RGB | 8bit | 6bit |
| PRIORITY | LOW | HIGH | HIGH | LOW | LOW | HIGH | LOW | HIGH |

FIG. 13

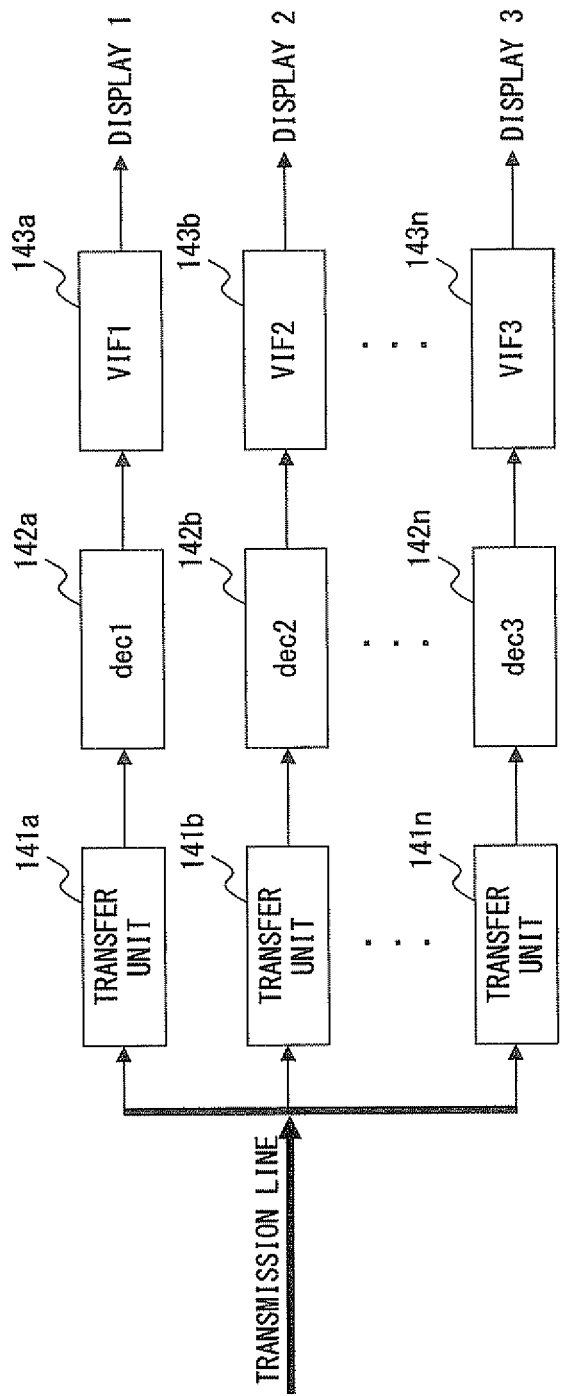
F I G. 14

MULTICHANNEL DATA TRANSFER APPARATUS AND ITS METHOD

CROSS-REFERENCE TO RELATED APPLICATIONS

This application is a continuation application of international PCT application No. PCT/JP2006/316113 filed on Aug. 16, 2006.

FIELD

The present invention relates to technology of performing a multichannel transmission of compressed data.

BACKGROUND

Recently, there are an increasing number of vehicles loaded with a plurality of image processing devices such as a navigation system, a DTV, a DVD player, a car-mounted camera. Therefore, when communications are established for a car-mounted image processing device and so on, a light multichannel transfer system having a small number of wires and harnesses is demanded.

For example, a camera 11 depicted as FIG. 1 fetches an image of a place falling on a blind spot of the view of a driver such as the side of a road, the backward of a vehicle, and outputs the image to a main display 15 and a rear-seat display 17 connected to the main display 15 via a bus 16. A DVD player 12 regenerates a DVD. A terrestrial wave digital broadcast tuner 13 selects terrestrial waves and converts them into video signals, converts the video signals into digital image data, and outputs them to the main display 15 and the rear-seat display 17. A car navigation system 14 updates the information indicating the current position of a car at predetermined intervals, and outputs the information to the main display 15 and the rear-seat display 17.

Thus, when a plurality of video sources are transferred from each image processing device, they are routed among plural image processing devices using harnesses and wires as described above. Therefore, it is necessary to transmit them in a simpler configuration with the number of wires and harnesses decreased.

According to the patent document 1, image processing devices such as a car-mounted camera are provided, and the power source to the image processing devices is supplied from a battery via a power supply line by cable. However, signals (data) are transmitted and received by wireless, not by cable. The signals transmitted and received between the camera control device for performing image processing and the image processing device can be captured video signals, control signals and so on. The video signals are processed and the video is displayed on a display.

Thus, proposed is a car-mounted camera system capable of receiving multichannel signals for eliminating the harnesses to realize a light system, reducing the cost of a cable and an assembly cost, and stably transmitting video signals in real time by connecting the car-mounted camera to the camera control device by wireless.

The patent document 2 discloses compressing and transmitting video to transmit the video using a transmission line of a narrow band (about 10 Mbps). A first transmission/reception device and a second transmission/reception device are provided for each of an instrument panel unit and a trunk room to mutually multiplex information signals of car-mounted electronic equipment, and a control signal for communications of an information signal between the first transmission/reception device and the second transmission/reception device is unified with an information signal. With the above-mentioned configuration, proposed are a communication device and a vehicle loaded with the communication device capable of easily performing communications by unifying an information signal of electronic equipment and a control signal of the information signal between a first transmission/reception device and a second transmission/reception device provided for each of an instrument panel unit and a trunk room to mutually multiplex information signals of connected electronic equipment.

The patent document 3 proposes omitting the trouble of converting data of a program stream output from an MPEG (moving picture experts group) 2 encoder into an MPEG 2 transport stream by dividing the data of the program stream output from the MPEG 2 encoder in a data transmission device, generating a packet by adding a header to the divided pack, and transmitting the packet using an IEEE (Institute of Electrical and Electronics Engineers) 1394 interface.

The patent document 4 proposes a car-mounted multichannel image processing device capable of easily processing multichannel image information about the vicinity of a vehicle. That is, scanning an image at equal intervals and in a predetermined order, or scanning an image at intervals and in an order changed depending on the operation state is proposed.

However, in the operation environment depicted as FIG. 1, the image data to be transmitted by each image processing device dynamically changes. Therefore, the image data of plural pieces of video transmitted from plural image processing devices cannot be efficiently transmitted.

In the image encoding and transmitting system using a low cost compressing system with the conventional car-mounted camera, data is compressed at a predetermined bit rate depending on the image size and the frame rate, and the number of channels to be transferred is statically determined by the bandwidth in the transmission line.

That is, when a plurality of channels are used in a conventional method, the number of channels is increased on the basis of a predetermined bit rate, and if a bandwidth of a transmission line is exceeded, the number cannot be increased any more.

The patent documents 1 through 4 do not disclose realizing a dynamic transmission of data through a plurality of channels as high quality images in a system of transmitting data in a fixed length by compressing the data after converting an image into a variable length code collectively in a plurality of lines. That is, they do not disclose determining a compression rate dynamically depending on the number of channels for transmitting image data by determining a compression rate for image data from each channel (so that the upper limit of the execution bandwidth can be approached, and the high quality image (low compression) can be read), and determining a fixed size in which data is transmitted to one frame depending on the determined compression rate.

Patent Document 1: Japanese Laid-open Patent Publication No. 2005-117614
Patent Document 2: Japanese Laid-open Patent Publication No. 2000-151643
Patent Document 3: Japanese Laid-open Patent Publication No. 11-177581
Patent Document 4: Japanese Laid-open Patent Publication No. 10-260324

SUMMARY

A multichannel data transfer apparatus connected to a transmission line in which a plurality of nodes connected through a transmission line as one of the aspects of the present invention have respective transmission channels, and transmit compressed data in a predetermined period on the basis of a bandwidth assigned for each channel includes: a calculation device for calculating a data compression rate and a bandwidth for each channel for transmitting the compressed data to the transmission line when the number of channels is changed in case a request to change the number of channels for transmitting the compressed data is issued in the period; and a notification device for notifying each channel of at least one of the calculated bandwidth and compression rate.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly point out in the appended claims.

It is to be understood that both the foregoing general description and the following detailed description are exemplary and explanatory only and are not restrictive of the invention, as claimed.

BRIEF DESCRIPTION OF THE DRAWINGS

FIG. 1 illustrates plural channel transmitting system and apparatus as an appropriate example of the present invention;

FIG. 2 illustrates the configuration of the transmission side of each node and a transmission line;

FIG. 3 is a time chart for adding a channel (CH2, 3) by adding a dynamic transfer method;

FIG. 5 is a block diagram showing the embodiment 1;

FIG. 6 is a table showing the number of channels capable of transferring data at the compression rate of 1/3 and 1/6 using a 400 Mbs transmission line (13941F execution 262 Mbps);

FIG. 12 illustrates the combination of the video sources of the embodiment 2;

FIG. 13 illustrates the combination of the video sources of the embodiment 3;

FIG. 14 illustrates the configuration on the reception side of each node and the transmission line;

DESCRIPTION OF EMBODIMENTS

Figure 4:
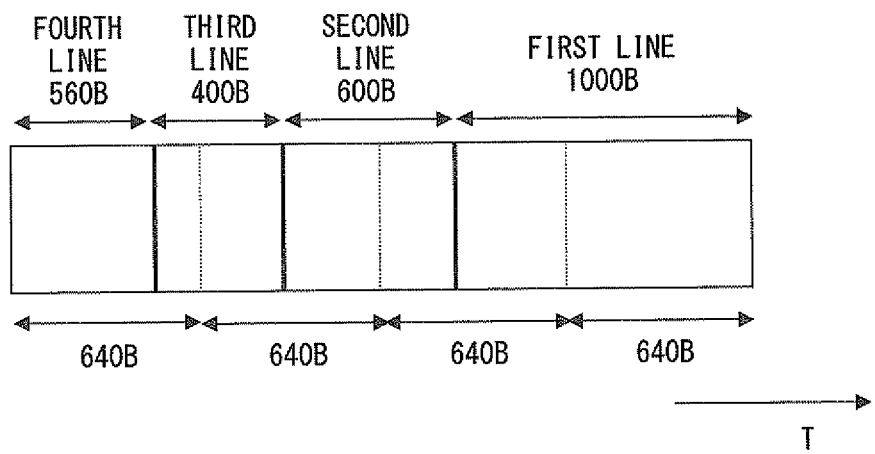
FIG. 4 illustrates the transfer by four lines.

In the transfer method according to the present invention, each of a plurality of nodes is assigned to a transmission line connected via a bus.

The compressed data is transmitted in a predetermined period to an isochronous channel assigned corresponding to the bandwidth of the node (transfer device, transfer layer). That is, data is transferred to a transmission line from a plurality of nodes (for example, an image processing device) in a predetermined period.

Then, a bandwidth (bit rate) corresponding to a channel number is assigned to the data (packet) transferred from each node. When data is transmitted from a node, data is superposed on a channel number acquired in advance of the transfer. In addition, each node changes the compression rate of the compressed data (compression device, compression layer).

When there is a request to change the number of channels in a period, the compression rate of the compressed data is changed for each channel inserted in the period. Then, the optimum compression rate and bandwidth at which the compressed data can be inserted in the period are calculated and inserted in the period (calculation device). In addition, at least the calculated bandwidth and compression rate is reported to each node (notification device).

During reception, a setting is made to receive data of a channel number acquired by a node (or nodes) in advance (reception device).

In the following explanation, a transmission of a packet can also be referred to as a transfer.

FIG. 2 illustrates the configuration of the transmission side of each node and a transmission line. The image data transferred from each node (11 through 14 depicted as FIG. 1) depicted as FIG. 1 is received by VIF (video interface) units 21a through 21n provided for each node. An output signal (image data and so on) of each of the VIF units 21a through 21n is connected to a corresponding unit of Codec units 22a through 22n. Next, the output signal is compressed again into a compression rate specified (dynamically or statically) by compression control units 22a through 22n (compression devices) The compression rate is set by a control signal depicted as FIG. 2. Then, variable length encoded compressed data is transferred to transfer units 23a through 23n (configured by a transfer device, a calculation device, and a notification device), and each node collectively compresses plural lines configuring part of the image to be transmitted into a fixed length, and transmits the resultant data.

That is, a compressing process is performed and variable length encoded data is transmitted in the data transfer method.

In addition, the present invention has a plurality of encoders (compression control units 22a through 22n), and also has a transmission unit (transfer units 23a through 23n) for independently transmitting the respective data from the encoders. Each transfer unit stores plural specific numbers of lines of encoded data in a buffer. Depending on a desired compression rate of image data to be encoded, the fixed size of data to be transferred to one frame is calculated, and the data in the buffer is divided and output to each frame in the transmission line. A device for changing a bit rate with transfer timing as a specific unit of a fixed bit rate is provided for the compression control units 22a through 22n and the transfer units 23a through 23n.

An isochronous transfer system represented by the IEEE 1394 can be used for the transfer units 23a through 23n. The transfer system is not limited to the IEEE 1394 so far as a device can be operated in the data transfer system having the same function as the isochronous transfer. For example, a USB (universal serial bus) can be used. In addition, the compression control unit can be not only an image processing device, but also any device that receives variable length or fixed length data (for example, image data, audio data, etc. as data) and outputs fixed length data.

In FIG. 2, a plurality of independent VIF units 21a through 21n and transfer units 23a through 23n are asynchronously controlled, and a packet generated in a transfer method using a fixed length line is transferred in a multichannel system. In FIG. 2, the VIF units 21a through 21n are operated by a clock 1 (for example, a reference clock 27 MHz), and the transfer units 23a through 23n asynchronously operate in the period of a clock 2.

The chart depicted as FIG. 3 is described below. In the chart depicted as FIG. 3, the horizontal axis indicates a time axis, and the horizontal axis indicates a periodically supplied signal and the data transferred in each period. The periodically supplied signal is generated and supplied by a cycle master etc. Although only 3200 bytes of compressed data from the channel 1 (CH1) is transferred as packet data to the band assigned in the first cycle, the data of the channel (CH2) is added in the second cycle. Therefore, the compression rate of the channel 1 is calculated again, and the compression rate that allows the total amount of data from two channels to be within the amount of data that can be transferred in one cycle is selected. As a result, the channel 1 changes the compression rate, and 3200 bytes are compressed into 1600 bytes. At this time, although the channel 2 is added, it is not necessary to increase the compression rate of the data from the channel 1 if the sum of the data of 3200 bytes from the channel 1 and the data from the channel 2 refers to the amount of data that can be transferred in one cycle. Then, the data of each channel is added with the timing of the VSYNC (vertical isochronous signal) of each node, and a packet of the channel 2 is transferred to the transmission line. In the next third cycle, a channel 3 is further added at an instruction to insert the channel 3 (CH3). If the total amount of transfer data from the channels 1, 2, and 3 can be transferred in one cycle, the channel 3 is added without a re-calculation for changing the compression rate of the channels 1 and 2.

For example, in FIG. 3, assume that 400 Mbps of the IEEE 1394 is used for the transmission line. In the 125 μsec interval of one isochronous transfer, 4096 bytes can be transferred in one cycle. Under the condition, assume that 3200 bytes of a car navigation image of 3-byte RGB data of 800×480 is being transferred only by the channel 1 (corresponding to the first cycle depicted as FIG. 3). At this time, since the band is not sufficient in interrupting VGA and RGB camera images, the compression rate of the car navigation image of the channel 1 is raised, and then, the VGA source is interrupted as the channel 2. Furthermore, when a DVD etc. is to be inserted as a source image, it can be interrupted as the channel 3 because the band is still available.

FIG. 4 illustrates an example of the configuration of a packet in the transfer method of the IEEE 1394. In this example, a fixed length code is assigned in four lines, and the code length in each line is 560 bytes, 400 bytes, 600 bytes, and 1000 bytes. A total of data of the four lines is a fixed length of 2400 bytes.

With the above-mentioned configuration, a dynamic transmission through a plurality of channels can be performed. For example, image data can be realized with high quality image compression.

Described next is an embodiment. In the explanation below, an example of an application of the present invention to a communication system (car-mounted LAN) such as a car-mounted image processing device etc. is described, but the application of the present invention is not limited to this example, and can be a transfer system in which data is transferred through a plurality of channels in a transfer path for performing a fixed length isochronous transfer and the number of channels is dynamically changed.

(Embodiment 1)

FIG. 5 illustrates the configuration of the embodiment 1. The configuration depicted as FIG. 5 is a block diagram of the configuration of the compression control units 22*a* through 22*n* and the transfer units 23*a* through 23*n* depicted as FIG. 2. The configuration includes the transmission unit (compression unit (compression layer), transfer unit (transfer layer)) of each image processing device such as the camera 11, the DVD player 12, the terrestrial wave digital broadcast tuner 13, the car navigation system 14 and so on determined with reference to FIG. 1.

In FIG. 5, a data transfer device 50 is configured by a compression control unit (corresponding to 22*a* through 22*n* depicted as FIG. 2) including a preprocessing unit 51, a quantization unit 52, a coding unit 53, a quantization table 54, a coding table 55, a buffer (first buffer 56, second buffer 57), etc., and a transfer unit (transfer device, calculation device, notification device) (corresponding to 23*a* through 23*n* depicted as FIG. 2) including an access control unit 58, a coding amount monitor unit 59, a one cycle transfer amount calculation unit 510, a data size calculation unit 511, a write destination switch timing control unit 512, a packet generation unit 513, a channel add control unit 514, an assignment amount calculation unit 515 and so on.

The compression unit is described below.

The preprocessing unit 51 reduces the redundancy of image data by performing preprocessing such as two-dimensional prediction differential pulse code modulation (two-dimensional prediction DPCM), one-dimensional prediction DPCM, one-dimensional discrete cosine transform (one-dimensional DCT) and so on.

The quantization unit 52 further performs rough quantization on the result of the preprocessing. The coding unit 53 performs variable length coding (Wyle coding, Golomb coding, Huffman coding, run length coding and so on) on the roughly quantized data.

The quantization table 54 holds a bit string probably output as a result of the preprocessing (tendency of output bit string) for each image processing device (11 through 14: channel), and there are a plurality of applicable quantization tables on the basis of the channel of the image data to be processed. Normally, the quantization table 54 is generated before starting the operation. However, the quantization table 54 can be dynamically generated without interference with the operation of the image processing device.

The coding table 55 holds a bit string easily output as a result of rough quantization (tendency of output bit strings) for each image processing device (channel), and a plurality of applicable coding tables are provided on the basis of the channel of image data to be processed. The coding table 55 is also generated before the start of the operation. However, the coding table 55 can also be dynamically generated without interference with the operation of the image processing device.

The first buffer 56 and the second buffer 57 are configured by, for example, a FIFO (first-in first-out), and stores data output from the coding unit 53. In the present embodiment, the buffer has a two-stage buffer structure, but can be a single buffer.

The access control unit 58 controls the access (read and write) of data from the coding unit 53 to the first buffer 56 and the second buffer 57.

The coding amount monitor unit 59 monitors the entire amount of code of the coded data sequentially stored in the first buffer 56 or the second buffer 57. When the amount of code is very large, an instruction to select a coding table or a quantization table is issued to reduce the amount of code on an average. When the amount of code is very small, an instruction to select a coding table or a quantization table is issued to increase the amount of code. In addition, an instruction to change the compression rate is received from the data size calculation unit 511, and an instruction to forcibly change the compression rate is output to the quantization table 54 and the coding table 55.

The configuration of the practical data compression by the compression unit is not limited to the above-mentioned configuration, but any configuration is acceptable so far as input data can be compressed at a plurality of compression rates, and the compression rates can be dynamically changed.

Described below is the transmission unit.

The one cycle transfer amount calculation unit 510 calculates the number of lines to be transferred in one cycle of the transfer period to the transfer path, and calculates the number of bytes corresponding to the number of lines. When the compression rate is to be changed at a channel add request, the number of bytes corresponding to the number of lines is re-calculated.

The data size calculation unit 511 acquires the amount of data buffered this time in the first buffer 56 or the second buffer 57, and calculates the average number of bytes in one line as a target in distributing invalid data, and the number of bytes of data read from the first buffer 56 or the second buffer 57. The data size calculation unit 511 notifies the coding amount monitor unit 59 of the compression rate. If the compression rate is to be changed when the channel add request is issued, a change instruction is issued to the coding amount monitor unit 59.

When the two-stage buffer is used, the write destination switch timing control unit 512 generates a switch signal indicating the timing of switching the buffer to allow a data write from the coding unit 53 from the first buffer 56 to the second buffer 57, or from the second buffer 57 to the first buffer 56. Also when one buffer is used, a switch can be realized by sectioning a data page and so on.

The packet generation unit 513 generates an isochronous packet on the basis of the data to which invalid data is added, or the data output from the first buffer 56 and the second buffer 57.

In addition, invalid data is added after the EOF (end of file) as necessary to the data output from the first buffer 56 or the second buffer 57. That is, an invalid bit (for example, "0", a stuffing bit) is added (stuffed) as padding.

In the present invention, the data length of the coding result of each line of the data to be encoded as a result of the variable length coding by the coding unit 53 indicates variances, but the coding result can have a fixed length in a plurality of lines by adding invalid data. Thus, the standard demanding a fixed length of transferred data can be satisfied in each transfer cycle, thereby realizing a real-time transfer with a simple configuration.

The variable length coded data obtained by the coding unit 53 is output to the first buffer 56 and the second buffer 57. However, the access control unit 58 performs control so that data can be written to one of the first buffer 56 and the second buffer 57 according to the signal from the write destination switch timing control unit 512. Therefore, the variable length coded data obtained by the coding unit 53 is written to one of the first buffer 56 and the second buffer 57.

The channel add control unit 514 outputs an instruction to calculate the amount of assignment of channels (bandwidth/bit rate) when an add-requested channel is added to the assignment amount calculation unit 515. On the basis of the calculation result, a notification is given to the one cycle transfer amount calculation unit 510. The channel add request can be a request to reduce the number of channels. In this case, inverse to the addition, the compression rate is reduced by resetting. The assignment amount calculation unit 515 can also perform re-calculation.

(Description of Operations)

Described below in detail is mainly the process by the transmission unit.

First, as described above, the variable length coded data obtained by the coding unit 53 is output to the first buffer 56 and the second buffer 57. However, the access control unit 58 performs control so that data can be written to one of the first buffer 56 and the second buffer 57 according to the signal from the write destination switch timing control unit 512. Therefore, the variable length coded data is written to one of the first buffer 56 and the second buffer 57. Then, before describing the operation of the write destination switch timing control unit 512, the method of calculating the amount of transfer in one cycle of the one cycle transfer amount calculation unit 510 is described. The one cycle transfer amount calculation unit 510 calculates the number of lines to be transferred in one cycle, and also calculates the number of bytes corresponding to the number of lines.

FIG. 6 illustrates the size of image data, the transfer rate, the compression rate, and the amount of transfer in one cycle of each image processing device (the camera 11, the DVD player 12, the terrestrial wave digital broadcast tuner 13, the car navigation system 14 and so on: channel s).

In FIG. 6, the item numbers correspond to the types of devices. For example, the item number "1" corresponds to the image data from the car navigation system 14, the item number "2" corresponds the image data from the DVD player 12. Each device is assigned to any channel, and the item number corresponds to a channel number.

The horizontal size indicates the number of pixels in one line of image data. The byte/pixel indicates the number of bytes per pixel. The vertical size indicates the number of lines of image data. The transfer rate indicates the number of pieces of image data (frames) to be transferred in one second. The compression rate indicates the compression rate at which data can be compressed under guarantee in the process from the preprocess to variable length coding (desired compression rate).

The bit rate (Mbps) indicates the data capacity corresponding to each item number with which a transfer can be actually performed in one second.

The number of lines to be transferred in one cycle indicates the number of lines (a value rounded up to an integer, and the number enclosed by parentheses is a value not rounded up) to be transferred in one cycle (125 µsec) of the IEEE 1394 for the image data of each channel to satisfy the specifications such as a condition etc. of a transfer rate. The number of bytes to be transferred in one cycle refers to the number of bytes corresponding to the number of lines.

In FIG. 6, in S400 (4096 bytes), the image data corresponding to each item number in one cycle refers to the total number of channels to be inserted. As depicted as FIG. 6, the bit rate in the transmission line depends on the compression rate. The item numbers "1" through "6" refer to the compression rate of 1/3. The item numbers "7" through "12" refer to the compression rate of 1/6. When the compression rate increases, the image quality is normally degraded. In the technique described in the present application, the number of channels in a transmission line variably controls the compression rate, and a transmission is performed with the highest image quality level at the time point.

The number of bytes to be transferred in one cycle, and the method of calculating the number of bytes to be transferred in one cycle are described below with reference to the case of the item number "1" (car navigation) depicted as FIG. 6.

First, in the item number "1", the transfer rate is 60 (frame/sec), and 480 lines are included in one frame of an image as the data to be transferred. Therefore, the number of lines to be transferred in one second is 60 (frame/sec)×480 (line/frame).

The number of lines can be equally divided for each cycle by the following equation.

60 (frame/sec)×480 (line/frame)×(1 sec/125 μsec)
=3.6.

That is, when 3.6 lines are used in transfer on an average in one cycle of transfer, the condition of the transfer rate can be satisfied. For example, when a transfer is performed equally using a plurality of lines in one cycle (it is not necessarily required), the transfer is performed using four lines in this case.

When four lines are transferred in the item number "1", one line includes 800 bytes, each pixel is formed by 3 bytes (one pixel: R, G, and B), and the compression rate is 1/3. Therefore, the number of bytes corresponding to the four lines is expressed by the following equation.

800 (byte/line)×4 (line)×3×(⅓)=3200 bytes

That is, various combinations are applicable depending on which standard of S100 through S1600 (S100 through S1600 are transfer speed standards of the IEEE 1394, and for example, S100 refers to 100 Mbps, S400 refers to 400 Mbps, and so forth as speed standards) is to be used, and how many channels of data of isochronous packets are transferred in one cycle.

For example, the S400 standard has the upper limit of 4K bytes of the number of bytes to be transferred in one cycle for the sum of the channels. When image data from the car navigation system 14 (item number "1") and the DVD player 12 (item number "2") is transferred in one cycle using the S400 standard, the numbers of bytes to be transferred in one cycle are respectively 3200 bytes and 960 bytes. Therefore, the sum is 3200+960=4160 bytes, and exceeds 4K (4096) bytes.

In S400, the bit rate (Mbps) is calculated in the following equation.

4096 (byte)×8 (bit)×(1 sec/125 μsec)=262.

In the item number "1", the following calculation is performed.

800×3.6 (line)×8 (bit)×(1 sec/125 μsec)=184.32

In the example depicted as FIG. 6, only the cases in which the compression rates are 1/3 and 1/6. However, at other compression rates, the amount of transfer can be calculated and controlled with the transfer rules for the transmission line and video observed (the amount of data to be transmitted in one second is observed).

The one cycle transfer amount calculation unit 510 depicted as FIG. 5 includes a part of the table depicted as FIG. 6, the device type (car navigation system, terrestrial wave digital broadcast tuner 13, DVD player 12 and so on) or a channel number is input, and the number of lines and the number of bytes to be transferred in one cycle corresponding to the device type or the channel number is calculated (acquired).

The number of bytes corresponds to 3.6 lines (2880 bytes) in the calculation above. However, for example, the number of bytes to be transferred (3200 bytes) corresponding to equally applicable four lines is used.

Next, the write destination switch timing control unit 512 inputs the number of lines generated by the one cycle transfer amount calculation unit 510, inputs an HSYNC (horizontal isochronous signal) signal indicating the leading position of each line, and the HSYNC signal is counted up to the number of lines. The signal clock (indicating the switch timing) indicating the position where the number of lines is reached is output to the access control unit 58.

The access control unit 58 switches the buffer that allows a data write from the coding unit 53 on the basis of the clock signal.

The data size calculation unit 511 inputs the number of lines and the number of bytes to be transferred in one cycle calculated by the one cycle transfer amount calculation unit 510, and inputs the signal indicating the switch timing calculated by the write destination switch timing control unit 512.

When the signal indicating the switch timing is input to the data size calculation unit 511, the data size calculation unit 511 acquires the number of bytes of the data transferred in the current cycle stored in the buffer (one of the first buffer 56 and the second buffer 57) in which a data write from the coding unit 53 is invalid at the switch timing.

The data size calculation unit 511 calculates the amount of data read at a time from a buffer by dividing the number of bytes currently acquired from the buffer by the number of lines to be transferred in one cycle by the one cycle transfer amount calculation unit 510.

The access control unit 58 that inputs the amount of data (number of bytes) to be read from the buffer instructs the buffer for which a write from the coding unit 53 is not permitted, that is, the buffer (the first buffer 56 or the second buffer 57) in which the data currently transferred is buffered, to output data by the number of bytes from the head.

When the number of bytes of data is output from the buffer at the instruction, the data is input to the packet generation unit 513. In addition, the average number of bytes per line is input from the data size calculation unit 511.

For the amount of data for a fixed length in the compression unit (compression layer), the residue after inputting data by a predetermined number of lines from the buffer is calculated, and the difference between the average number of bytes per line and the number of bytes of the data acquired from the buffer is obtained, and the invalid data (the data including the code indicating that the pixel value is invalid, that is, invalid data) is added for the difference, thereby arranging the amount of data to be transferred in one packet for a fixed length.

The packet generation unit 513 inputs the number of lines to be transferred in one cycle calculated by the one cycle transfer amount calculation unit 510.

Figure 7:
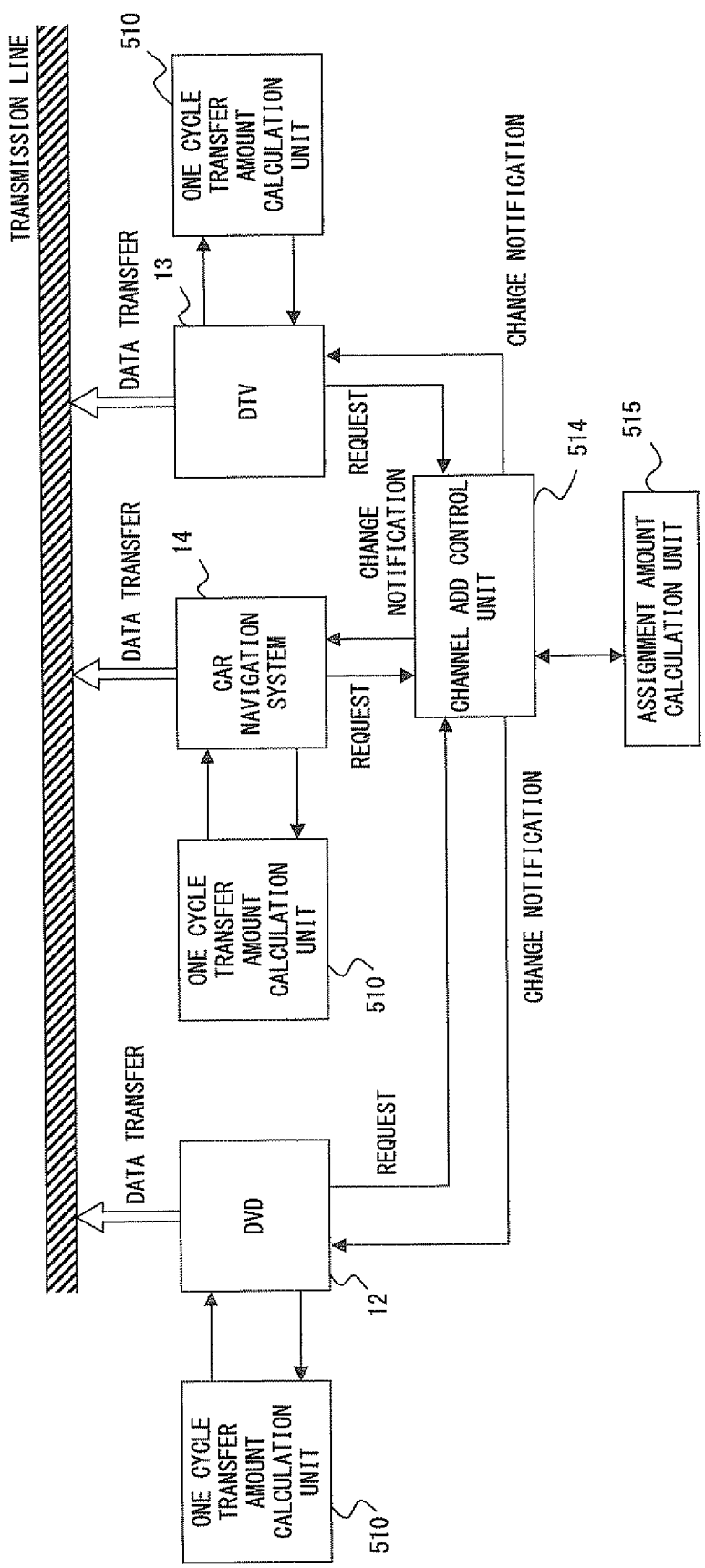
FIG. 7 illustrates a node of an isochronous manager and other nodes.

FIG. 7 illustrates a plurality of image processing devices connected via a bud. Described for example is the multichannel transmission using isochronous transfer relatively high-speed equal to or higher than 400 Mbps such as a car-mounted LAN depicted as FIG. 7 and so on.

The connection between nodes can allow not only a daisy chain, but also a branch. Therefore, a tree structure can be realized.

The signal of a physical layer is transmitted using, for example, two sets of twist pair lines. A strobe signal and data is transmitted, and the receiving side generates a clock by obtaining an exclusive logical sum (DS coding system). At one time point, a half-duplex two-way communication in which there is only one node for transmitting data to a bus is performed, and the data transfer rate is 98.304 M (S100) bps, 196.608 M (S200) bps, and 393.216 (S400) bps are defined.

It is determined whether or not there is a bias output by a connection partner for each port, and a node has been connected or removed in the bus initialization. At this time, the node that has detected a change of the connection state of a port transmits a bus reset signal for a predetermined time to the connected port. Upon receipt of the signal, the reception node transmits a bus reset signal to a further connected port, thereby transmitting a bus reset signal to all nodes by repeating the operations.

Furthermore, each node transmits a parent_notify signal, associates a child-parent set from the correlation in the transmission/reception process, and a tree structure is generated. The port (child) that has received a parent_notify signal has a node labeled with "child" finally in every port as a root. Afterwards, the root functions as an arbiter.

Next, all nodes on the bus transmit and receive self ID packets of respective nodes, and each node ID depends on the frequency of the self ID packets of other nodes received before each node transmits a self ID packet.

The arbitration is transmitted by a signal to all nodes connected to the bus in the IEEE 1394, but before each equipment unit starts its transmission, it is necessary to acquire a bus use right. The use right can be acquired as follows. A node outputs a transmit request signal "request" to its parent node. The node that has received the "request" relays it to its parent node, and the "request" is further transmitted to the root. Upon receipt of the "request", the root returns a permission signal "grant", and a node that has received the "grant" is ready for sending. When a plurality of nodes simultaneously output "request", "grant" is output to the node whose signal is received faster, and other nodes receive a transmission disable signal "data_prefix". The node that has received "grant" transmits a data packet according to the DS coding after the transmission start signal, and finally outputs a transmission termination signal, thereby terminating the transmission.

In the serial bus addressing of the IEEE 1394, 64-bit fixed addressing is used. The bus ID of 10 higher bits (1023 at maximum) and the node ID of the following 16 bits (63 at maximum) identify the equipment, and the remaining 48 bits are assigned as an address space of a node.

The transfer of a packet is a half-duplex communication system, and the process for transferring a packet (subaction) includes an isochronous subaction and an asynchronous subaction. The isochronous subaction is guaranteed for a rate of data communications because packets are transferred at regular intervals. The isochronous manager (management node) selected at the initialization of the bus assigns a necessary channel number and band to a node for performing an isochronous transfer. Similarly, the cycle master selected at the initialization of the bus transmits a cycle start packet every 125 μseconds. The node assigned with a band starts arbitration (Arb) after an isochronous gap after receiving a cycle start packet as depicted as FIG. 8, and transmits an isochronous packet. Since the isochronous gap has a period shorter than the subaction gap, a higher program is given to the node for performing a isochronous transfer not to the node for starting an asynchronous transfer after detecting a subaction gap.

In FIG. 7, the node (image processing device) functioning as an isochronous manager (root) changes the compression rate for the DVD player 12, the terrestrial wave digital broadcast tuner 13, and the car navigation system 14.

In FIG. 7, for convenience of explanation, the channel add control unit 514 and the assignment amount calculation unit 515 are separated from the DVD player 12, the car navigation system 14, and the terrestrial wave digital broadcast tuner 13, but actually, in the configuration depicted as FIG. 2 for the DVD player 12, the car navigation system 14, and the terrestrial wave digital broadcast tuner 13, any one image processing device as a root (any device can be a root) can correspond to them.

For example, when the DVD player 12 is a root, the channel add control unit 514 of the DVD player 12 receives a request using the terrestrial wave digital broadcast tuner 13 and the car navigation system 14. As a receiving method, for example, the asynchronous transfer of the IEEE 1394 can be used, and a signal line using another request signal can be provided. At a channel add request, the assignment amount calculation unit 515 of the isochronous manager (the DVD player 12 in this example) assigns a bandwidth for the terrestrial wave digital broadcast tuner 13 and the car navigation system 14 so that the amount of transfer can fall within one cycle (125 μsec). The result is acquired by the channel add control unit 514 of the isochronous manager (the DVD player 12 in this example), a change is reported by an asynchronous transfer to each node (channel), and permission for a change of a compression rate is obtained (notification device).

According to the change notification, the terrestrial wave digital broadcast tuner 13 and the car navigation system 14 add a source packet header and a compressed data at the indicated compression rate to the band of each channel, and output them from the packet generation unit 513 provided for the terrestrial wave digital broadcast tuner 13 and the car navigation system 14 to the bus. As a result, the data for each channel output from each node is transferred to a predetermined band for each cycle.

Figure 8:
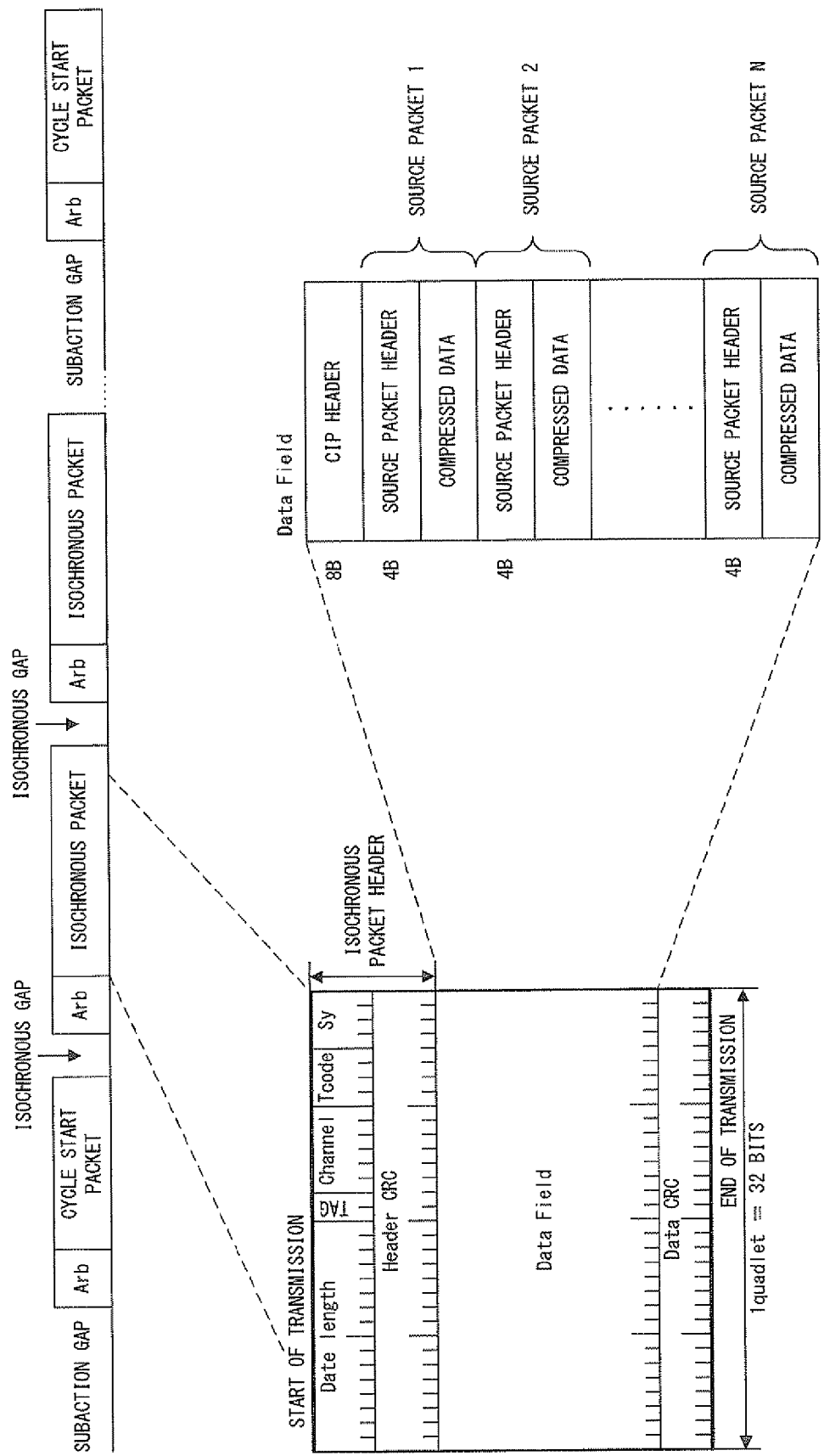
FIG. 8 illustrates the isochronous sub-action and the data structure.

As depicted as FIG. 8, the isochronous packet has a 4-byte header, a 4-byte header CRC (error detection), data, and 4-byte data CRC. Data is divided into small parts as shown on the right in FIG. 8, and a CIP header followed by the repetition of a source packet as a combination of a source packet header and compressed data. For example, only the portion of compressed data can be encoded. With the above-mentioned configuration, an isochronous packet includes data rounded to have N times larger than a source packet.

Figure 9:
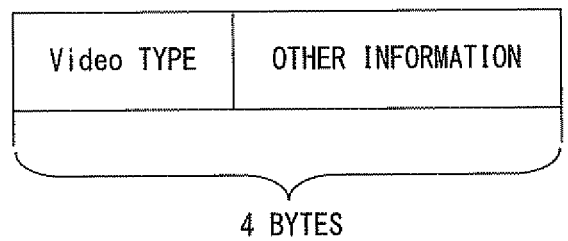
FIG. 9 illustrates the structure of a source packet header.

A source packet header is configured by the video type and other information as depicted as FIG. 9. The item number of a table depicted as FIG. 6 is inserted into a video type, and the information about each image size, compression rate, etc. can be recognized.

Figure 10:
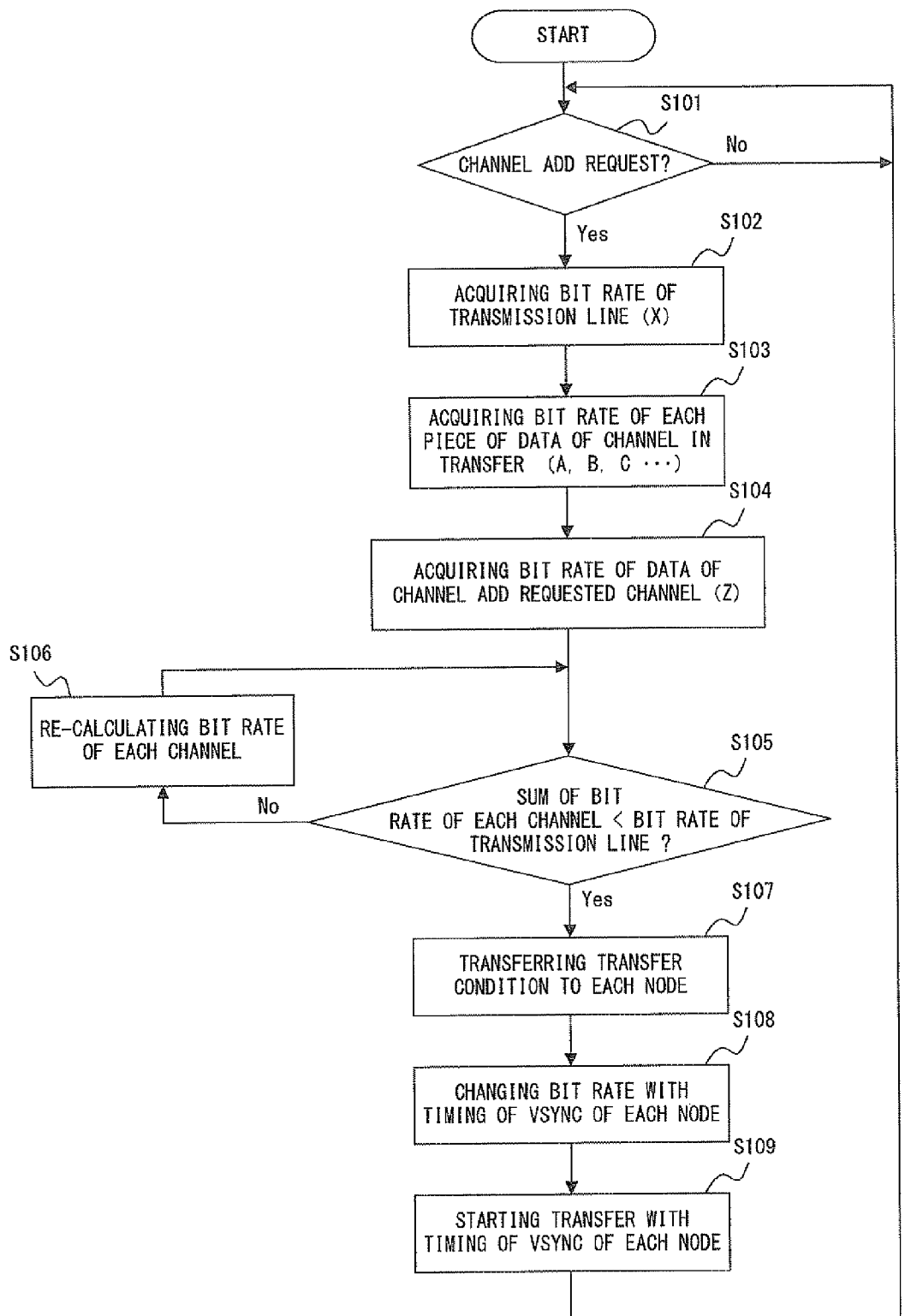
FIG. 10 is a flowchart showing the embodiment 1.

FIG. 10 illustrates the flowchart of adding a channel in a node functioning as an isochronous manager, and as a result of adding a channel, a flowchart of a node whose new transfer condition is transferred.

In step S101, when there is a request to newly add a channel from other nodes in addition to the data channel from the node currently being transferred, then control is passed to step S102. In FIG. 5, a channel add request is input to the channel add control unit 514, and a channel to be added by the add instruction is recognized.

In step S102, the bit rate of the transmission line is acquired. The bit rate of the transmission line is defined as X.

In step S103, the bit rate of the data of each channel currently being transmitted is acquired. The bit rate of each piece of data is defined as A, B, and C.

In step S104, the bit rate of the channel add requested channel is acquired. The bit rate of the channel add requested channel is set as Z. At this time, the bit rate of Z is set to indicate the highest bit rate. The highest bit rate indicates the most efficient in the lookup table preset as depicted as FIG. 6, that is, the highest bit rate in the allowed transmission 1394 (for example, 400 Mbs). Although not detected in the LUT, a new combination obtained by the calculation depicted as FIG. 6 can be adopted.

In step S105, the total X of the bit rate allowed in the transmission line, and the bit rate of each channel (the currently transferred channel, and a new channel add requested channel) is compared. As a result, if X>A+B+C+ . . . +Z, then a new channel is to be added although the bit rate (compression rate) of each channel is not changed. Accordingly, control is passed to step S107. Otherwise, the total of the amount of transmitted data from each channel exceeds the highest bit rate permitted by the transmission line, and the transmission cannot be performed as is. Therefore, since it is necessary to change the bit rate (compression rate) of each channel, control is passed to step S106.

In step S106, the bit rate is set again. If the total of the bit rates is higher as a result of comparing the bit rate permitted by the transmission line, the bit rate of the channel being transmitted, and the bit rate of the add requested channel, then the compression rate of the compressed data is changed (the compression rate is enhanced), the total of the bit rate of the channel being transmitted and the bit rate of the add requested channel is calculated again, and the bit rate is re-calculated until the total becomes smaller. If the total is larger than the determination in step S105, the compression rate is raised step by step for each channel (decreasing the bit rate step by step) on the basis of the table depicted as FIG. 6 in step S106, so that the total indicates the maximum below the bit rate of the transmission line. Unless the total falls below, the priority (Navigation system, DVD, TV, camera 1, camera 2 and so on) depicted as FIG. 12 is referred to, and a lower priority can be disabled for sending. Otherwise, the transmission of the transmitting channel can be stopped on the basis of the priority to decrease the number of channels.

The process in steps S105 and S106 is repeated as necessary. If the determination in step S105 is YES, the channel add control unit 514 depicted as FIG. 5 outputs to the assignment amount calculation unit 515 the specification to calculate the channel assignment amount (bandwidth) to the channel to be added and the channel to be transferred. The assignment amount calculation unit 515 notifies the channel add control unit 514 that the condition (compression rate for each channel) in S105 holds. The permission (change report depicted as FIG. 7) for a channel add request is allowed for each node.

The node as an isochronous manager notifies other nodes of the bandwidth and compression rate for each channel on the basis of the result of recalculation. The other nodes that have received the notification superpose the compressed data in a predetermined period at a bandwidth of the compressed data of the channel corresponding to the node assigned to each node.

In steps S108 and S109, each node notified of the transfer conditions changes the bit rate with VSYNC timing, and also starts a transfer.

The channel add control unit 514 notifies the one cycle transfer amount calculation unit 510 of the information such as a bandwidth and so on. Afterwards, the isochronous manager and other nodes have the compression rate of the compression unit forcibly changed by the coding amount monitor unit 59 through the data size calculation unit 511 with the respective VSYNC timing.

In the description with reference to FIG. 10, a channel is added. When the number of channels is decreased, a channel delete request is received in step S101. In step S106, the recalculation is performed to determine whether or not the compression rate of the channel that continues a transmission (whether or not the image quality can be improved by enhancing the bit rate). That is, the compression rate is reduced step by step in order from the highest priority (enhancing the bit rate step by step) to obtain the maximum value below the bit rate of the transmission line having the sum of bit rates of the channels that continues transmission.

In the above-mentioned processes, the present invention dynamically changes the compression rate of each channel depending on the increase or decrease of the channel for performing the transmission, and simultaneously realizes the transmission with the current highest image quality.

Figure 11:
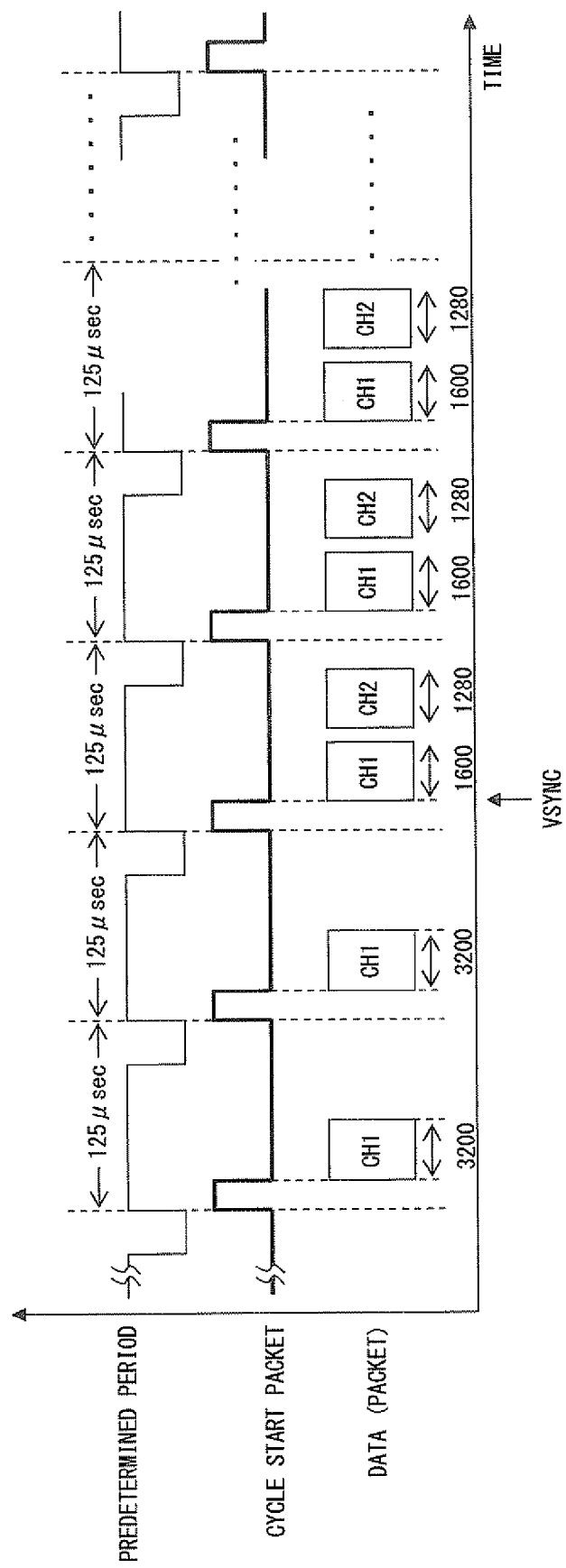
FIG. 11 is a time chart of the embodiment 1.

FIG. 11 is a time chart. The horizontal axis indicates a time axis, and the vertical axis indicates one cycle of the IEEE 1394 (125 μsec) as a predetermined period. In the first cycle, only the channel 1 (CH1) transfers data after the generation of a cycle start packet. When a channel add request for the additional channel 2 (CH2) is issued, the process in the flowchart depicted as FIG. 10 is performed, and the compression rate of the channel 1 and the channel 2 is determined. As a result, in the third cycle, the compression rate of the channel 1 is reduced (that is, there is a decreasing amount of data transferred on one cycle through the channel 1), and the channel 2 is added. The channel 1 has data transferred from the corresponding node in the channel 1 with the VSYNC timing of the channel 1. The channel 2 has the data from the corresponding node of the channel 2 with the VSYNC timing of the channel 2.

It is desired that the transmission start timing of the new AV stream is set for immediately start if there is an available bandwidth in a period, and for the start if there occurs synchronization between the VSYNC and the 1394 transfer frames.

An AV stream can be added with a simple circuit configuration without unnatural feeling to a user by sequentially transferring data with the VSYNC timing of each channel.

In the mode of the embodiment 1, a predetermined bandwidth can be fully utilized. Therefore, high quality images can be acquired. That is, the exclusive band can be controlled on the entire video sources for high image quality such that the upper limit of the effective bandwidth of the IEEE1394 can be utilized.

In addition to the system above, the band can be controlled with a priority tag (added to the source packet header) added to the video sources. That is, the priority can be assigned to the car navigation system, the DVD player, and the DTV, etc. in this order, and the compression rate an be controlled (for a compression rate necessary and sufficient for higher image quality) by the video sources. In this case, when the bit rate of each channel is re-calculated in step S106 depicted as FIG. 10, the compression rate is increased step by step in order from the channel having the lowest priority (decreasing the bit rate step by step), and the determination in step S105 is repeated. Thus, the compression rate of a channel having a lower priority can be increased without reducing the compression rate of a channel having a higher priority, thereby dynamically increasing the number of transfer channels with the high quality of images of a channel having a higher priority maintained.

According to the present invention, a dynamic transfer through a plurality of channels can be performed with high image quality on compressed data after variable length coding by a system of transmitting data in a fixed length collectively for a plurality of lines.

Furthermore, according to the present invention, a transmitting method can be managed by a combination with a coding method, thereby dynamically increasing the number of channels relatively with ease. In addition, a dynamic transfer through a plurality of channels can be performed with high image quality on compressed data after variable length coding of images by a system of transmitting data in a fixed length collectively for a plurality of lines.

Additionally, depending on the number of channels for transferring image data to a transmission line, the compression rate for the image data from each channel can be determined (so that the upper limit of the execution bandwidth can be closely reached, and the highest possible image quality (low compression) can be attained) and the fixed size for a transfer in one frame can be determined depending on the determined compression rate.

In addition, dynamically depending on the number of channels ready to send image data, the compression rate for each channel is determined, thereby transferring data with the highest image quality allowed in the transmission line.

(Embodiment 2)

The embodiment 1 is the method for controlling the band by the calculation using a priority tag on the video sources. In this case, the image data to be transferred through, for example, the car navigation system 14, the DVD player 12, and the terrestrial wave digital broadcast tuner 13 in this order is assigned a priority, and the device from which the video sources are transmitted is clearly indicated. That is, a setting is made on each node side, the priority of the image data of the car navigation system 14, the DVD player 12 and the terrestrial wave digital broadcast tuner 13 is managed for each type.

In the embodiment 2, the compression rate is set by the combination of channels to be inserted in the period, and the compression rate is changed by assigning a priority to each combination.

The calculation in steps S105 and S106 depicted as FIG. 10 can be controlled by the combination by determining in the LUT (lookup table) in advance as depicted as FIG. 12. When the above-mentioned priorities are to be observed, the highest priority is assigned to the image data transmitted from the car navigation system 14. If data is not transmitted from the device other than the car navigation system 14, the priority tag "1" and the compression rate of 1/3 are determined. When the priority tag is "2", each of the car navigation system 14 and the terrestrial wave digital broadcast tuner 13 is assigned the compression rate of 1/3. When the priority tag "3" is used, the compression of the car navigation system 14 and the DVD player 12 is the compression rate of 1/3. When the priority tag "4" is used, the compression rate of the car navigation system 14 is set as the compression of 1/6, and the compression rate of the DVD player 12 and the terrestrial wave digital broadcast tuner 13 is set as 1/3. When the priority tag "5" is used, the car navigation system 14 is set as the compression of the compression rate 1/6, and the DVD player 12 and the player are set as the compression of the compression rate 1/3. Simultaneously, when there are cameras 1 and 2, the compression rate of their image data is 1/3.

In the description above, the priority refers to the priority of high image quality. That is, the compression rate of a lower priority is raised for lower image quality, or the transfer is prohibited or stopped.

When the compression rate cannot be reduced or the image quality cannot be satisfied with a lower compression rate, the transmission of the image source having a low priority is suppressed. In this case, the transfer of an image source or a plurality of video sources is stopped (user specified).

In the system of the embodiment 2, the type of channel is considered, and the compression rate of the image data from each channel can be determined.

(Embodiment 3)

Next, an example of obtaining high image quality by controlling a compression rate by video sources is depicted below.

In the embodiment 3, constantly regardless of the video sources, or depending on the video size, frame rate, color space, and the dynamic range of color components, etc., the compression rate is distributed with a shift. For example, since a high compression rate is not possible when an image is small, a high compression rate is set if the dynamic range of a color component is small. That is, a compression rate is changed by assigning a priority of setting a compression rate depending on the type of compressed data of a channel inserted in a period.

FIG. 13 illustrates the combination of video sources. In the table depicted as FIG. 13, what type of data is to be assigned an enhanced priority (that is, high image quality is realized on the basis of priority) is determined with reference to the size, frame, color space, and color component dynamic range.

The video size is assigned a priority depending on the relative size to a predetermined video size.

A high priority is set for 15 (frame/sec), and a low priority is set for 30 (frame/sec).

A low priority is set for "YUV", and a high priority is set for "RGB".

A low priority is set for "8 bits" for the color component dynamic range, and a high priority is set for "6 bits".

For example, when there occur insufficient bands by adding transfer data from an add requested channel to the transfer data from each channel currently in transfer, the data having a high priority is compressed at a high bit rate on a priority basis. If the insufficient bands still continue, data having a low priority is prevented from interruption as a source.

After determining the priority using a fixed table depicted as the embodiment 2, a priority is further assigned to each node using the table depicted as FIG. 13 to perform a calculation for assignment of a band.

In the system of the embodiment 3, a priority can be assigned to a compression rate depending on the video sources. Regardless of the channel, a compression rate of image data from each channel can be determined by considering the video size, the frame rate, the color space, and the dynamic range of color components.

The video size, the frame rate, the color space, and the dynamic range of color components can be assigned priorities.

(Embodiment 4)

The configuration on the receiving side is described below.

FIG. 14 illustrates the configuration of the receiving side of each node. The packet transmitted from the transmission line is received by transfer units 141a through 141n, decoding units 142a through 142n reconstruct the data from each of the transfer units 141a through 141n, and the reconstructed data is output to each indicator through VIF units 143a through 143n.

Figure 15:
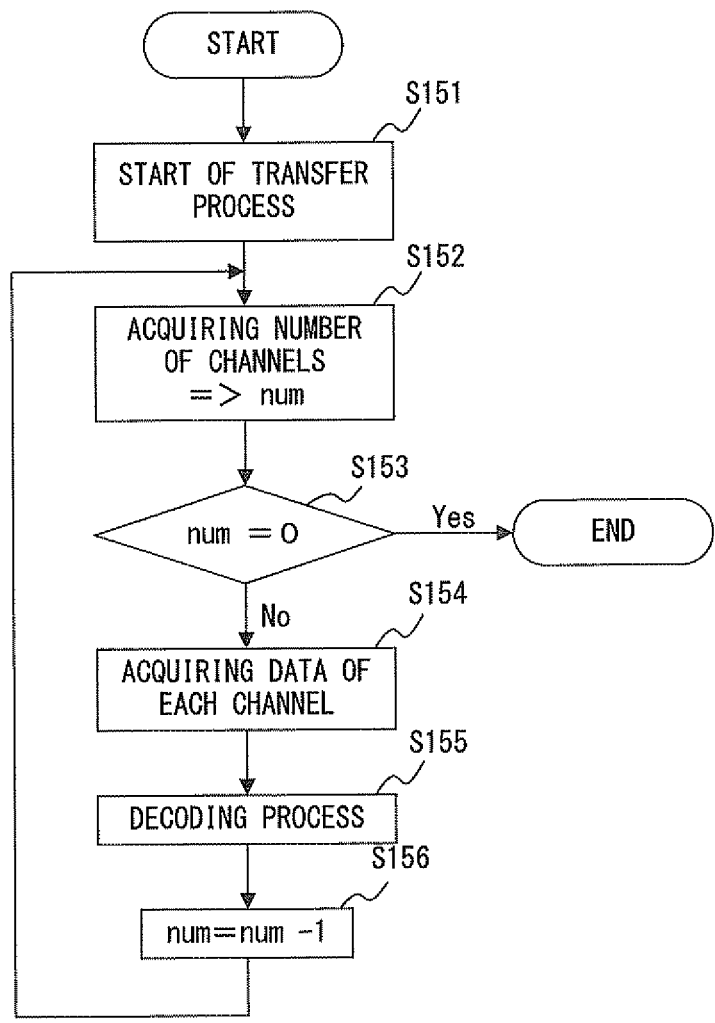
FIG. 15 is a flowchart of the embodiment 4.

FIG. 15 is a flowchart for explanation of the receiving process (decoding process) in each node. In step S151, each node (image processing device: the camera 11, the DVD player 12, the terrestrial wave digital broadcast tuner 13 and so on depicted as FIG. 1) starts its transfer process.

Each of the main display 15, the rear-seat display 17 connected through the main display 15 and the bus 16, etc. receive transferred data. In each node on the receiving side, data of a channel transmitted by an isochronous transfer is acquired in step S152, and the number of channels is set as num. If the received data is the data in the related channel, the processes from step S153 to step S155 are performed.

In step S153, it is determined whether or not num equals 0. If it equals 0, the reception is terminated. Otherwise, control is passed to step S154.

In step S154, data is acquired if the received data belongs to the related channel.

In step S155, the received data is decoded.

When the received data is not the data of the related channel, num is decremented in step S156, and control is passed to step S152.

In addition, a predetermined program (multichannel data transfer program) having sources of the steps in the embodiments 1 through 4 above is stored in the memory (ROM and so on) of the computer (including PU and image processing device) provided in a multichannel data transfer apparatus (LSI and so on) externally using a PC and so on, and written to the computer at the activation to perform the above-mentioned steps.

In addition, using a computer (including an image processing device such as a CPU, an FPGA and so on) as a single unit, a predetermined program (multichannel data transfer program) having sources of the steps in the embodiments 1 through 4 above is stored in the memory (ROM and so on) and written to the computer at the activation to perform the above-mentioned steps.

The present invention can also be embodied by generating a control program for directing the CPU of a standard computer (for example, an image processing device) to perform the process of the flowchart described above and recording on a computer-readable record medium so that the program can be read from the record medium to the computer and executed by the CPU.

Figure 16:
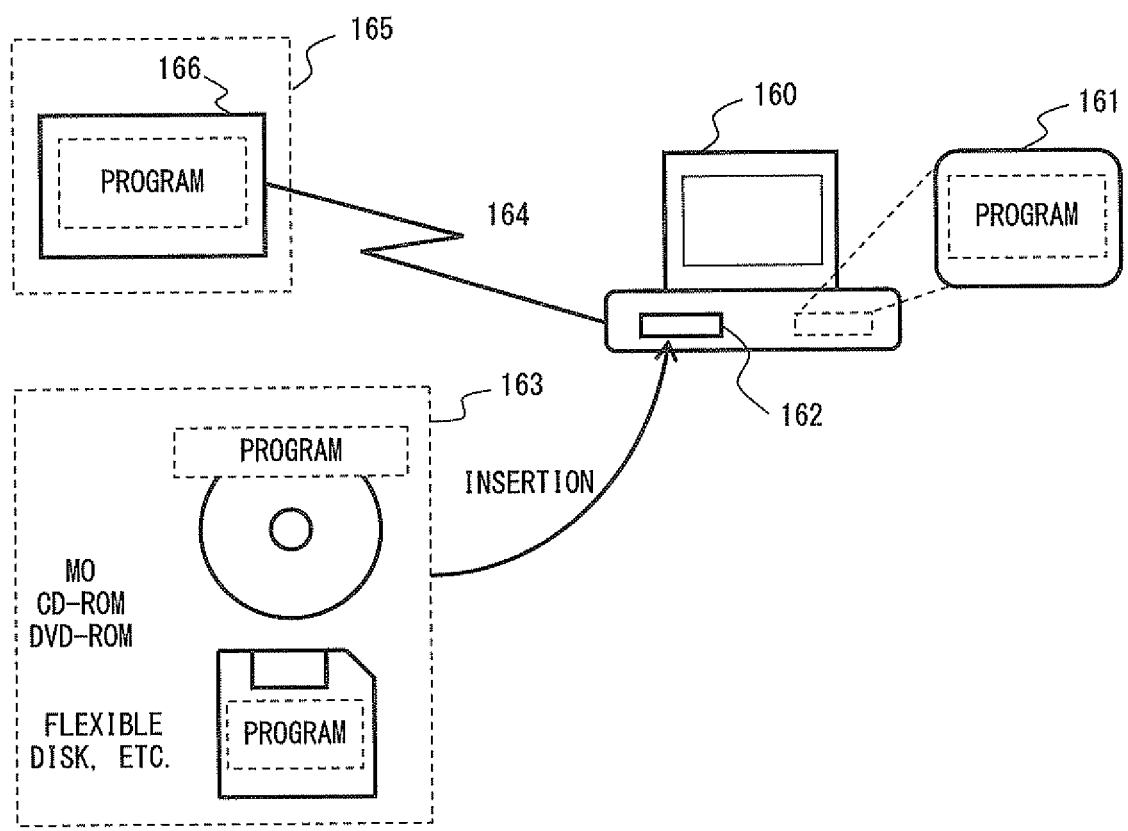
FIG. 16 illustrates an example of the configuration of the record medium capable of reading a program by a computer.

FIG. 16 illustrates an example of a record medium from which the recorded control program can be read by a computer system. The record medium can be a storage device 161, for example, ROM built-in a computer system 160 or a hard disk device provided as an external accessory device, or a portable storage medium 163 such as a flexible disk, an MO (magneto optical disk), CD-ROM, DVD-ROM from which a control program recorded by insertion into a medium drive device 162 provided for the computer system 160 can be read.

The record medium can also be a storage device 166 provided for a computer system functioning as a program server 165 connected to the computer system 160 through a communication line 164. In this case, a transmission signal obtained by modulating a carrier wave by a data signal representing the control program is transmitted from the program server 165 to the computer system 160 through the communication line 164 as a transmission medium, and the computer system 160 can regenerate the control program by demodulating the received transmission signal, thereby executing the control program by the CPU of the computer system 160.

In addition, the present invention is not limited to the embodiments above, but can be improved or varied in various manners within the scope of the gist of the present invention.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor dose the organization of such examples in the specification relate to a showing of the superiority and inferiority of the invention. Although the embodiment(s) of the present invention(s) has (have) been described in detail, it should be understood that the various changes, substitutions, and alterations could be made hereto without departing from the spirit and scope of the invention.

What is claimed is:

1. A multichannel data transfer apparatus connected to a transmission line in which a plurality of nodes connected through a transmission line have respective transmission channels, and transmit compressed data in a predetermined period on a basis of a bandwidth assigned for each channel, comprising:
a computer
to acquire a bit rate of the transmission line when a number of channels is changed,
to acquire a bit rate of the compressed data for each channel during transmission,
to set a highest bit rate of an add-requested channel,
to compare the bit rate of the transmission line with a sum of the bit rate of the channel during transmission and the bit rate of the change-requested channel, changing a compression rate of the compressed data when the sum is larger,
to recalculate the sum of the bit rate of the channel during transmission and the bit rate of the add-requested channel, and to recalculate a bit rate until the sum becomes smaller,
to recalculate a bandwidth using the recalculated bit rate,
to notify the node of the bandwidth and the compression rate for each channel on a basis of a result of the recalculation, and
to transmit the compressed data in a predetermined period on the bandwidth of the compressed data of the channel corresponding to the node,
wherein when a channel delete request is received, the computer
reduces the compression rate step by step in order from a highest priority and
recalculates the bit rate so that a sum of bit rates of the channels that continue transmission is maximized below the bit rate of the transmission line.

2. The apparatus according to claim 1, wherein the computer sets the compression rate by the combination of the channels inserted in the period to change the compression rate depending on a priority set by the combination.

3. The apparatus according to claim 1, wherein the computer changes the compression rate by assigning a priority for setting the compression rate by the type of compressed data of the channel inserted into the period.

4. A multichannel data transfer method implemented by directing at least one computer in each of a plurality of nodes connected via a transmission line, comprising:
acquiring a bit rate of the transmission line when a number of channels is changed;
acquiring a bit rate of the compressed data for each channel during transmission;
setting a highest bit rate of an add-requested channel;
comparing the bit rate of the transmission line with a sum of the bit rate of the channel during transmission and the bit rate of the change-requested channel, changing the compression rate of the compressed data when the sum is larger, and recalculating the sum of the bit rate of the channel during transmission and the bit rate of the add-requested channel, and recalculating a bit rate until the sum becomes smaller;
recalculating a bandwidth using the recalculated bit rate;
notifying the node of the bandwidth and the compression rate for each channel on a basis of a result of the recalculation; and
transmitting the compressed data in a predetermined period on the bandwidth of the compressed data of the channel corresponding to the node, and
when a channel delete request is received,
reducing the compression rate step by step in order from a highest priority; and
recalculating the bit rate so that a sum of bit rates of the channels that continue transmission is maximized below the bit rate of the transmission line.

5. The method according to claim 4, wherein the compression rate is set by the combination of the channels inserted in the period, and the compression rate is changed depending on the priority set by the combination.

6. The method according to claim 4, wherein the compression rate is changed by assigning a priority in setting the compression rate by the type of the compressed data of the channel inserted in the period.

7. A non-transitory computer-readable recording medium storing a program for use in a multichannel data transfer apparatus for compressing and transferring data to direct a computer to perform a method comprising:
- a process of each of a plurality of nodes connected in a transmission line having a transmission channel, and superposing compressed data in a predetermined period on a transmission line and transmitting the data depending on a bandwidth assigned to each channel;
- a process of acquiring a bit rate of the transmission line when a number of channels is changed;
- a process of acquiring a bit rate of the compressed data for each channel during transmission;
- a process of setting a highest bit rate of an add-requested channel;
- a process of comparing the bit rate of the transmission line with a sum of the bit rate of the channel during transmission and the bit rate of the change-requested channel, changing the compression rate of the compressed data when the sum is larger, and recalculating the sum of the bit rate of the channel during transmission and the bit rate of the add-requested channel, and recalculating a bit rate until the sum becomes smaller;
- a process of recalculating a bandwidth using the recalculated bit rate;
- a process of notifying the node of the bandwidth and the compression rate for each channel on a basis of a result of the recalculation; and
- a process of superposing the compressed data in a predetermined period on the bandwidth of the compressed data of the channel corresponding to the node, and
when a channel delete request is received, the computer performs
- a process of reducing the compression rate step by step in order from a highest priority; and
- a process of recalculating the bit rate so that a sum of bit rates of the channels that continue transmission is maximized below the bit rate of the transmission line.

8. The non-transitory recording medium according to claim 7, wherein the compression rate is set by the combination of the channels inserted in the period, and the compression rate is changed depending on the priority set by the combination.

9. The non-transitory recording medium according to claim 7, wherein the compression rate is changed by assigning a priority in setting the compression rate by the type of the compressed data of the channel inserted in the period.

* * * * *